United States Patent [19]
Muthukrishnan et al.

[11] Patent Number: 6,052,689
[45] Date of Patent: Apr. 18, 2000

[54] COMPUTER METHOD, APPARATUS AND PROGRAMMED MEDIUM FOR MORE EFFICIENT DATABASE MANAGEMENT USING HISTOGRAMS WITH A BOUNDED ERROR SELECTIVITY ESTIMATION

[75] Inventors: Shanmugavelayut Muthukrishnan, New York, N.Y.; Viswanath Poosala, Highland Park; Torsten Suel, Springfield, both of N.J.

[73] Assignee: Lucent Technologies, Inc., Murray Hill, N.J.

[21] Appl. No.: 09/062,589

[22] Filed: Apr. 20, 1998

[51] Int. Cl.[7] .................................................. G06F 17/30
[52] U.S. Cl. .............................................. 707/101; 707/2
[58] Field of Search ........................... 707/1–10, 101–104

[56] References Cited

U.S. PATENT DOCUMENTS

| | | | |
|---|---|---|---|
| 4,956,774 | 9/1990 | Shibamiya et al. | 364/200 |
| 5,630,120 | 5/1997 | Vachey | 395/602 |
| 5,689,696 | 11/1997 | Gibbons et al. | 395/601 |
| 5,717,915 | 2/1998 | Stolfo et al. | 395/605 |
| 5,870,752 | 2/1999 | Gibbons et al. | 707/102 |
| 5,915,250 | 6/1999 | Jain et al. | 707/100 |
| 5,950,185 | 9/1999 | Alon et al. | 707/1 |
| 5,987,468 | 11/1999 | Singh et al. | 707/100 |
| 6,003,029 | 12/1999 | Agrawal et al. | 707/7 |

Primary Examiner—Ayaz R. Sheikh
Assistant Examiner—Jigar Pancholi
Attorney, Agent, or Firm—Dickstein Shapiro Morin & Oshinsky LLP

[57] ABSTRACT

A computer method, apparatus and programmed medium for optimizing the number of buckets, and thus minimizing the necessary amount of memory space, needed to construct a histogram of a data distribution contained within a computer database with a cumulative error bounded by a specified threshold. The method according to the present invention allows a user to determine the near-minimal memory space necessary to store an approximation of a database with a maximum error measure at most three times that specified by the user to allow the user to maximize computer resources.

33 Claims, 5 Drawing Sheets

COMPUTER METHOD, APPARATUS AND PROGRAMMED MEDIUM FOR MORE EFFICIENT DATABASE MANAGEMENT USING HISTOGRAMS WITH A BOUNDED ERROR SELECTIVITY ESTIMATION

FIELD OF THE INVENTION

The present invention relates in general to a computer method, apparatus and programmed medium for determining the minimal number of buckets, and thus minimizing the necessary amount of memory space, needed to construct a histogram of a data distribution contained within a computer database with a cumulative error bounded by a specified threshold. In particular, it provides a fast method to find near minimal memory space required to approximate a large database using a histogram technique that does not significantly exceed a specified error created by the approximation.

BACKGROUND OF THE INVENTION

Since their invention, computers have been used to store extensive amounts of data in large databases. A database is defined as a collection of items, organized according to a data model and accessed via queries. For example, consider a computer database, also called a data warehouse, which comprises vast historical data, such as all sales transactions over the history of a large department store. For the purpose of decision making, such as determining whether or not to continue selling a particular item, users are often interested in analyzing the data by identifying trends in the data rather than individual records in isolation. This process usually involves posing complex aggregate user queries to large amounts of data in a database. In this case, it is often desirable for a user to access small statistical summaries of the data for the purpose of solving aggregate queries approximately, as this is significantly more efficient than accessing the entire historical data.

A fundamental problem arising in many areas of database manipulation is the efficient and accurate approximation of large data distributions using a limited amount of memory space. For example, traditionally, histograms have been used to approximate database contents for selectivity estimation in query optimizers.

Selectivity estimation is the problem of estimating the result size (or selectivity) of a query on a database. Such estimations are important in several key Database Management Systems (DBMSs) components. In particular, query optimizers use estimates for the size of intermediate relations in order to estimate the cost of different query execution plans in order to choose the one with minimum cost.

Some techniques for selectivity estimation include histograms, sampling, and parametric techniques. Of these, histogram-based techniques are the most widely used in current commercial DBMSs.

Histograms approximate the frequency distribution of one or several attributes by grouping the frequency values into buckets and approximating the frequencies inside a bucket by using certain statistics (e.g., the average or geometric mean of the frequencies) maintained for each bucket. Histograms have been studied extensively for a single attribute, and to a limited extent, for two or more attributes. The main advantages of histograms are their low time and memory space overheads, which allow for a fast and reasonable approximation of the frequencies of many common distributions.

The state-of-the-art in the histogram-based approach for selectivity estimation, however, has a conceptual and technical shortcoming. When approximating data frequency distributions, there is a natural trade-off between the accuracy of the approximation and the amount of memory space needed for its representation (i.e., the number of buckets in the histogram). The greater the number of buckets used, and corresponding greater amount of memory space used, to approximate the entire data distribution, the greater the accuracy of the approximation, i.e. the smaller the error of approximation.

All previous methods of approximation have focused on finding an approximation with minimal or small error, given a fixed amount of memory space; thus, the user has no direct means of specifying a desired error bound in the approximation. The user may wish to determine the size of the memory space that will be necessary in order to produce an approximation of a large database within a specified error of the approximation.

This problem, namely, minimizing the memory space used by the histogram given an acceptable error level for approximating the distribution, is appropriate if there is no hard limit on the memory space, but there is a need for a guaranteed bound on the error. Even in the presence of a tight memory space constraint, understanding and exploiting the trade-off between memory space and accuracy is important to decide how to allocate the available memory space to the various attributes and their histograms. Allocating the same amount of memory space to all histograms may often be a bad idea, as different histograms will have different "sweet spots" in their space-accuracy trade-offs. This problem is particularly important in applications where statistics may require a significant amount of space, e.g., approximately answering complex queries on a very large data warehouse.

Thus, problems still exist in the formulation of histogram-based techniques for selectivity estimation. The present invention has been designed to mitigate problems associated with histogram-based techniques for selectivity estimation.

SUMMARY OF THE INVENTION

The present invention advantageously provides a computer method, apparatus and programmed medium for quickly solving the problem of determining near-minimum amount of memory space that can be used to store an approximation of a database, where the approximation is performed by partitioning the database into regions and approximating each region, and where the error level for approximating the database is within an acceptable threshold as specified by the user.

The invention achieves the above and other features and advantages by determining an upper limit for the number of regions the database can be partitioned into for approximation which will not exceed the maximum error level specified by the user by at most a factor of three, and through an extremely efficient iterative process determining a near-minimal value, i.e., at most three times the minimal value, for the number of regions that can be used which will not cause the maximum error level for the approximation as specified by the user to be exceeded by more than a factor of three.

The above and other advantages and features of the invention will become more readily apparent from the following detailed description of the invention which is provided in connection with the accompanying drawings.

DETAILED DESCRIPTION OF THE PREFERRED EMBODIMENT

Consider again a large data warehouse comprising vast historical data, such as all transactions over the history of a large department store. For the purposes of decision making, a user is often interested in identifying trends in the data rather than each individual record in isolation. In this case, the user will want to access small statistical summaries of the data for the purpose of solving aggregate queries approximately; however, the user will want to ensure that the statistical summaries (or approximations) of the data are reliable, i.e. the approximation of the data warehouse does not result in a significant error of approximation. If the errors created by approximating the database are too large, the user will be unable to accurately and efficiently analyze the data. Thus, the user seeks an approximation that is both more manageable in terms of memory space and time, while maintaining a reliable degree of accuracy of the results, i.e. minimizing the error created by approximating the database.

If the user knows a value for the error of approximation that would be acceptable for analysis purposes, he may desire to determine the minimal amount of memory space necessary to produce the approximation within that specified error. Determining the amount of memory necessary to produce the approximation within the specified error will enable a user to better allocate resources, such as memory space, between multiple databases while maintaining approximations with sufficient accuracy.

Figure 1:
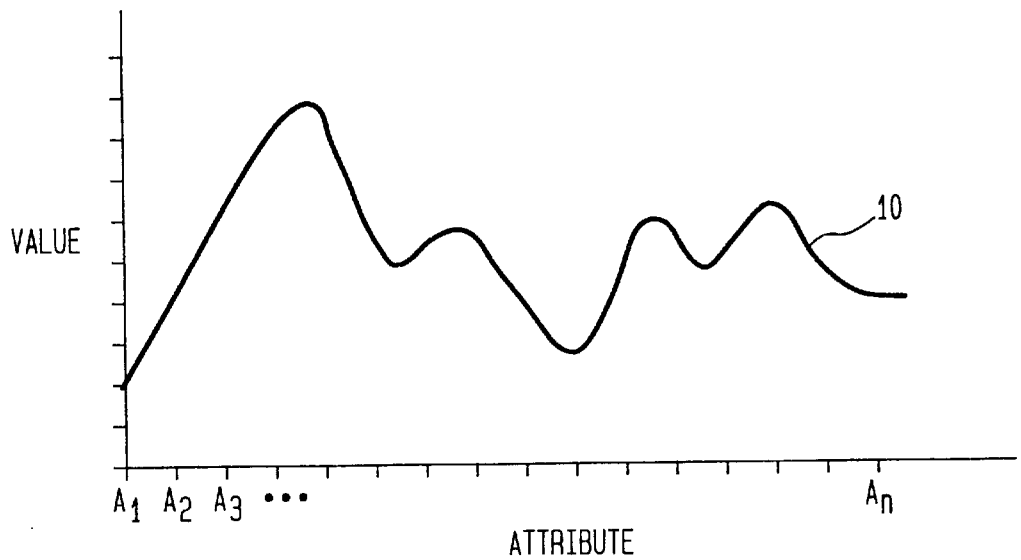
FIG. 1 illustrates a sample data distribution of a one-dimensional array database.

Suppose the data distribution of the data warehouse from above is an array A which consists of attribute values $A_1$, $A_2, \ldots, A_n$, where the values of the attributes are assumed to be totally ordered (e.g., the attributes are numeric as in sales transactions, or character strings as in Employee names, etc.) FIG. 1 illustrates a sample data distribution of a database, which comprises a plurality of data points, each of which indicates the frequency of the attribute values $A_1 \ldots A_n$. Curve 10 represents the value of each attribute.

Figure 2:
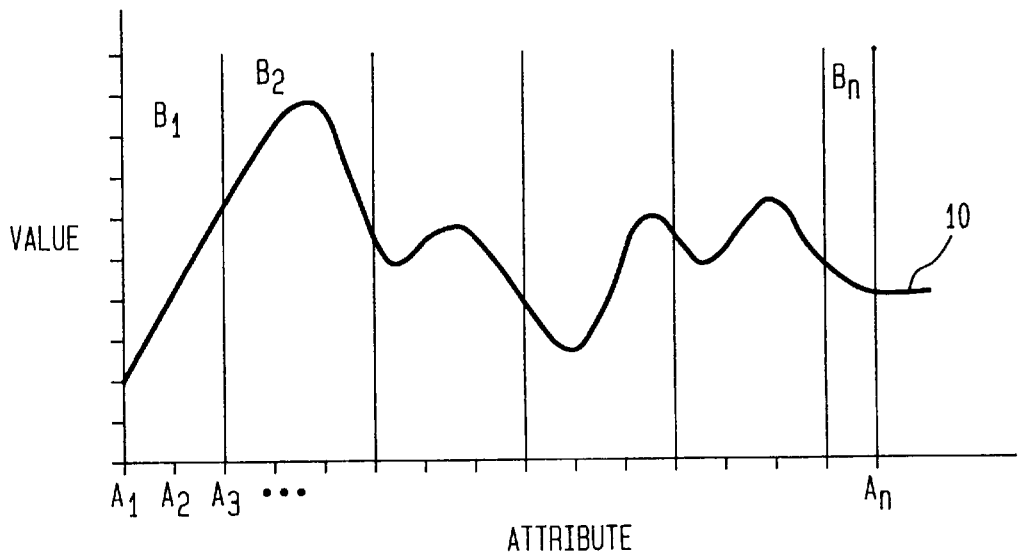
FIG. 2 illustrates an example of partitioning the data distribution into buckets.

A one-dimensional histogram on $A[1 \ldots n]$ consists of a partitioning of A into k linear regions or intervals (called buckets), together with a small number of statistics for each bucket, such as the average or spread of the frequencies in the bucket. FIG. 2 illustrates an example of a partitioning of the data distribution into buckets, designated $B_1, \ldots, B_n$. If a histogram is based on two or more attributes, the array is partitioned into rectangles.

Such a histogram can then be used to estimate the frequency of a value, or a set of values, by using the statistics in the corresponding buckets. By using the estimates, an accurate representation of a large database can be stored utilizing a reduced amount of memory. A user wishing to analyze the data for decision making purposes will pose a query against the estimation. By utilizing the estimation, a response to the user input data query can be obtained in a much quicker time frame while using a reduced amount of memory. However, any estimation of each region will result in some error between the actual data points of the region and the estimation of the entire region.

The problem of computing a good histogram is to find a partitioning that gives a good approximation of the frequency distribution of the entire data distribution of the database with a small number of buckets, where the quality of an approximation, determined by an error measure, is maintained within some bound specified by the user.

In general, there are many different possible measures for the error in approximating a distribution. For example, the error measure could be taken as the maximum absolute or relative error in approximating any point of the distribution, or the average error (possibly weighted) over all points. For simplicity, the concept of an error measure is developed for the case of a one-dimensional distribution, which extends naturally to two and more dimensions.

An error measure is a combination $L_p(L_q(E))$ or, simply, $(L_{p,q}^E)$, where (1) E is the point error function, which defines the error in approximating a single point of the distribution, (2) $L_q$ is the bucket norm, which combines the point errors into the error of approximating a bucket, and (3) $L_p$ is the partition norm, which combines the bucket errors into the error of approximating the entire distribution.

Important examples of point error functions are ABS (geom), defined as the absolute error with respect to the geometric median (the average of maximum and minimum values) of the frequencies in a bucket, and SQR(avg), defined as the square of the absolute error with respect to the average of the frequencies in a bucket.

For the bucket and partition norms, of particular interest are cases of $L_1$ and $L_\infty$ norms, where the L1 norm is the sum of the errors in all regions and the $L_\infty$ norm is the maximum error of any region. Thus, $L_{1,1}^{SQR(avg)}$ refers to the sum, over all points and all buckets, of the square of the absolute error in each point, while $L_{\infty,\infty}^{ABS(geom)}$ refers to the maximum, over all points and all buckets, of the absolute error. These error measures, when applied to a partition, give the cumulative or total error. Error measures $L_{1,1}^{SQR(avg)}$ and $L_{\infty,\infty}^{ABS}$ (geom) are the most popular measures in the literature on histogram-based selectivity estimation.

As previously stated, typical histogram construction has focused on finding an approximation of a data distribution with minimal or small error given a fixed amount of memory space. The present invention allows a user to construct a histogram while maintaining the error of approximation within a factor of three of a specified error of approximation using a minimal amount of memory space.

Figure 3:
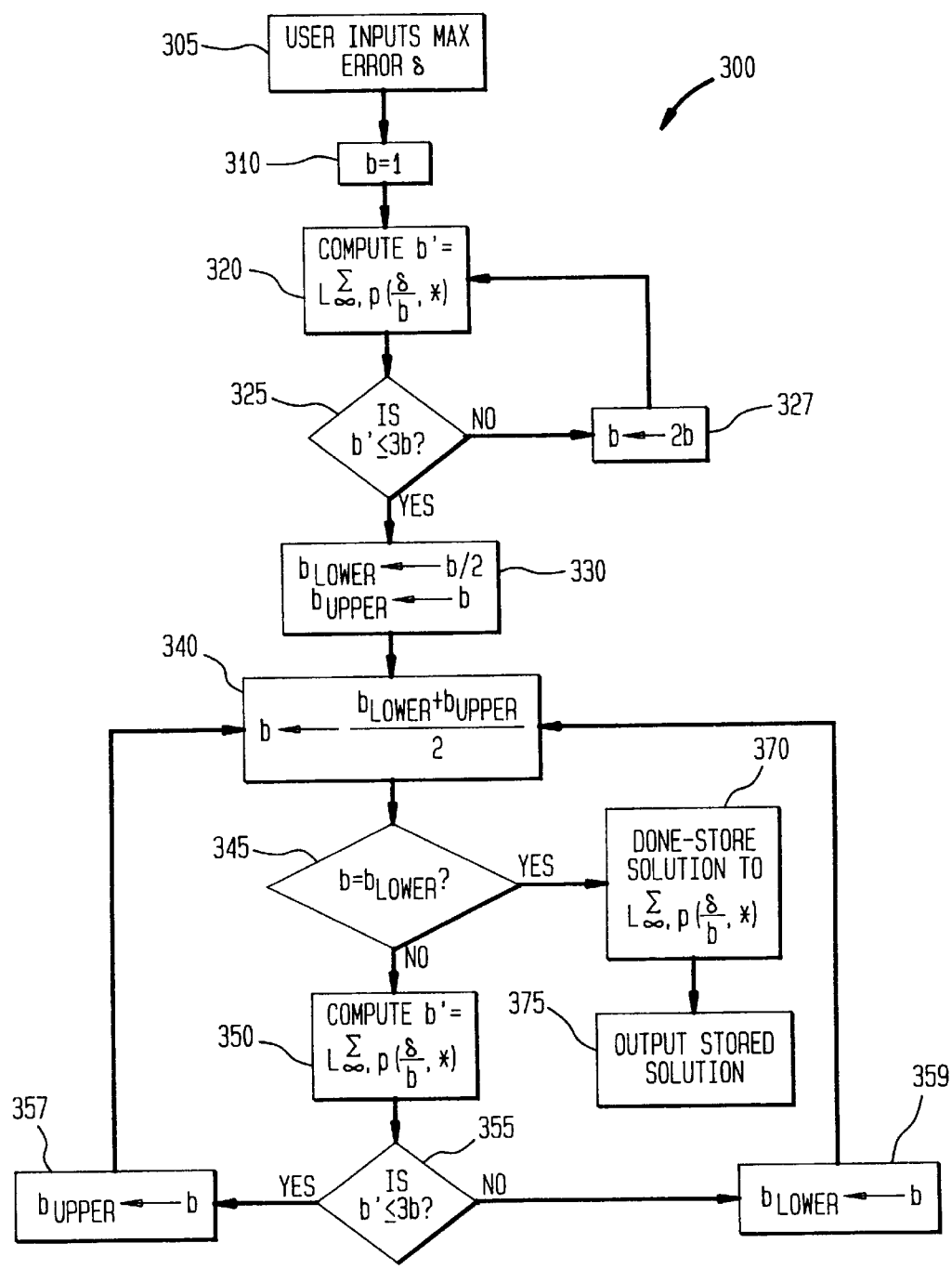
FIG. 3 illustrates, in flow chart form, a method of approximating a database within a given error of approximation using a minimal amount of memory space according to the present invention.

FIG. 3 illustrates in flow chart form the method 300 of the present invention for determining the optimal number of buckets needed to construct a histogram with an error of approximation within a factor of three times an error of approximation specified by the user.

The problem can be stated as follows: Given an array A of size n which represents a data distribution of a database and a desired maximum error of approximation δ for the database, it is desired to determine the minimal number of regions (buckets), and thus minimal amount of memory space needed, that can be used to approximate the contents of array A while maintaining the error within 3δ.

The user may input a desired maximum error of approximation δ (Step 305), which will be stored in the system. An upper limit for the number of buckets b that can be used to approximate the data distribution while maintaining the error within 3δ is first determined. A binary search technique, as described below, is used to determine the upper limit. In step 310, b is first assigned the value of 1. In step 320, b', which is the value of the error measure $L_{p,q}^E(\delta/b, *)$, is computed utilizing the initial value of b from step 310 and the specified error δ.

Figure 4:
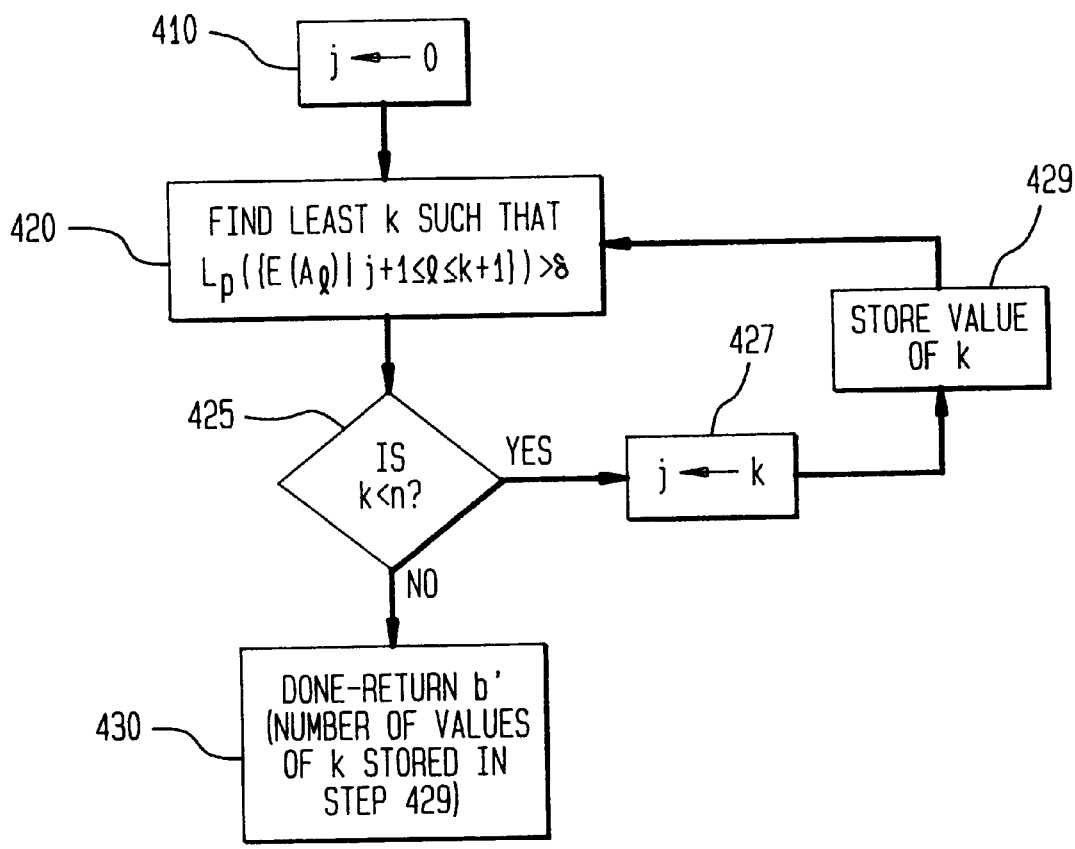
FIG. 4 illustrates, in flow chart form, a subroutine performed within the method of the present invention.

FIG. 4 illustrates in flow chart form the computation of the solution to the error measure of step 320 in FIG. 3. To solve the error measure for b', the least k, where k is the number of regions, such that $$L_p(\{E(A_l)|j+1 \leq l \leq k+1\}) > \delta$$

must be found, in which b' will be the number of k's computed.

To do this, variable j is initially assigned a value of 0 (Step 410). In step 420, the least k is determined by the steps illustrated in flowchart form in FIG. 5. In step 510, variable $k_{lower}$ is assigned an initial value of j+1, while variable $k_{upper}$ is assigned an initial value of n. In step 520, a value for t is determined by halving the sum of $k_{upper}$ and $k_{lower}$. In step 530, the value of $k_{upper}$+1 is compared to the value of $k_{lower}$. If $k_{lower}$ is different than $k_{upper}$+1, step 540 computes the partition norm Lp with the current values of $k_{lower}$ and t, and assigns the result to a variable x. Step 550 compares the value of x calculated in step 540 to the original error δ measure specified.

If x is greater than δ, $k_{upper}$ is assigned the value of t previously used (Step 553), and a new value for t is determined in step 520. If x is less than or equal to δ, $k_{lower}$ is assigned the value of t previously used (Step 555), and a new value for t is determined in step 520.

The process of steps 520 through 555 will repeat until $k_{lower}$ is equal to $k_{upper}$+1 in step 530, at which point the value of k found is the least k which satisfies the requirement of step 420. In step 570, the value determined for $k_{upper}$ is returned to step 420 of FIG. 4.

Figure 5:
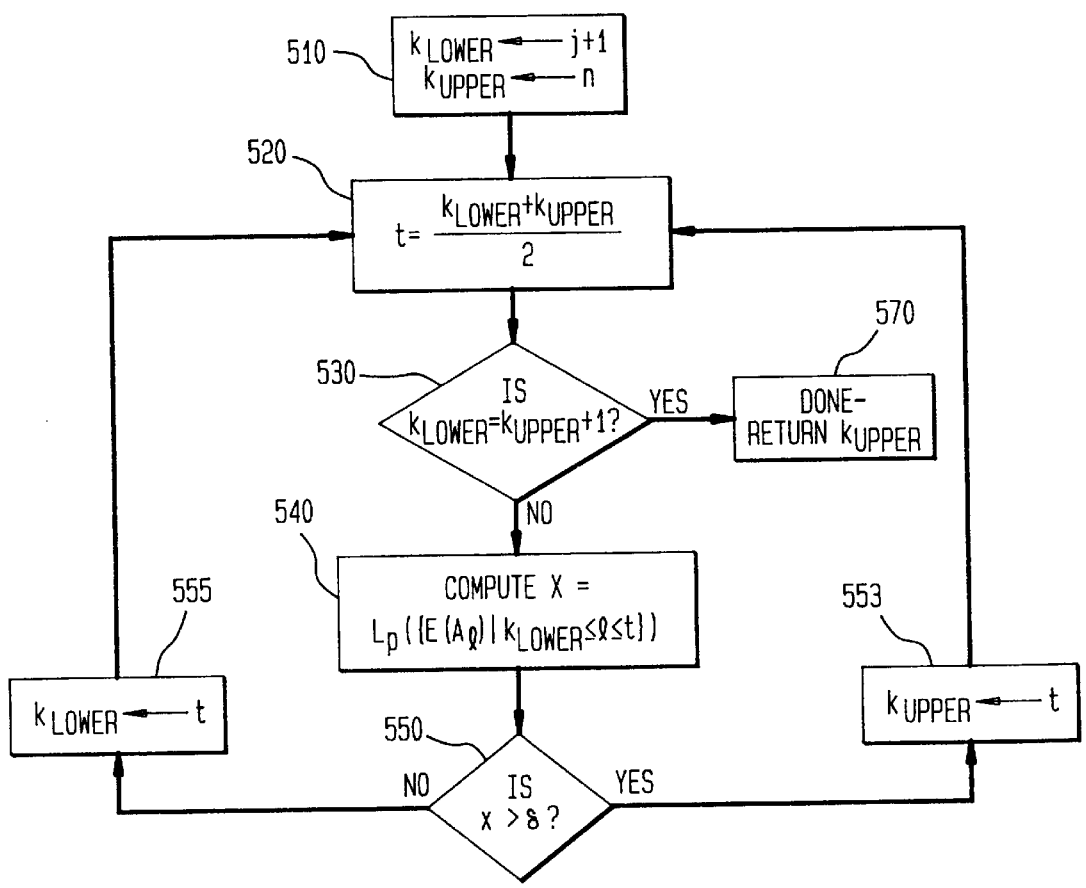
FIG. 5 illustrates, in flow chart form, a further subroutine performed within the method of the present invention.

The value of the least k found by the process of FIG. 5 is compared with the value of n (the size of the array) in step 425 of FIG. 4. If k is less n, j is assigned the value of k in step 427, the value of k is stored in step 429, and the new value of j from step 427 is used to determine the least k which satisfies the error measure $L_p(\{E(A_l)|j+1 \leq l \leq k+1\}) > \delta$ in step 420. If the value of k found by the process of FIG. 5 is greater than or equal to n, the process of FIG. 4 is completed and b' is returned in step 430 to step 320 of FIG. 3, where b' is equal to the number of values of k computed and the bucket boundaries as determined by the value of k stored in step 429.

Once a value for b' as determined by the steps of FIGS. 4 and 5 is returned in step 320 of FIG. 3, the value of b' is compared to the value of 3b in step 325. If b' is greater than 3b, the value of b is doubled in step 327 and the error measure in step 320 will again be computed using the new value of b.

If b' is less than or equal to 3b in step 325, b is the upper limit for at most three times the number of regions (buckets) into which array A can be partitioned and approximated within at most three times the specified error of approximation. The use of the factor of 3 provides an estimation that is reasonably accurate in a minimal amount of time; however, the invention need not be limited to only a factor of three. The remaining steps of the general method 300 determine if the upper limit for the number of buckets is the minimal number of buckets that can be used while maintaining the specified error, or if the number of buckets (and associated memory space) can be decreased.

In step 330, $b_{lower}$ is assigned a value of one-half of the value for b found by the iterative process of steps 310–327, while $b_{upper}$ is assigned the value of b. In step 340, a new value for b is computed as one-half of the sum of $b_{lower}$ and $b_{upper}$. In step 345, the value of b as determined in step 340 is compared to the value of $b_{lower}$ assigned in step 330. If b does not equal $b_{lower}$, a new error measure b' is computed in step 350. The computation of b' is similar to that of the computation of b' described with respect to step 320, and will not be repeated here.

In step 355, the value of b' returned from step 350 is compared to the value of 3b, where b is the value from step 340. If b' is greater than 3b, $b_{lower}$ is assigned the value of b (previously calculated in step 340) in step 359 and a new b is computed (Step 340) using the new value of $b_{lower}$. If b' is not greater than 3b, $b_{upper}$ is assigned the value of b (previously calculated in step 340) in step 357 and a new b is computed (Step 340) using the new value of $b_{upper}$.

Steps 340 through 359 are repeated until b is equal to $b_{lower}$ in step 345. When b is equal to $b_{lower}$, that value for b is at most three times the minimal number of buckets that can be used to approximate the data distribution of database A within at most three times the specified error δ. This value of b is stored in step 370. In step 375, this value of b is output. Based on this value of b, a user, wishing to maintain a specified error δ of approximation, can construct an approximation of a database using a histogram technique utilizing at most three times the minimum amount of memory space within an error at most three times δ. Thus, a user can maximize resources in the management of the database.

Figure 6:
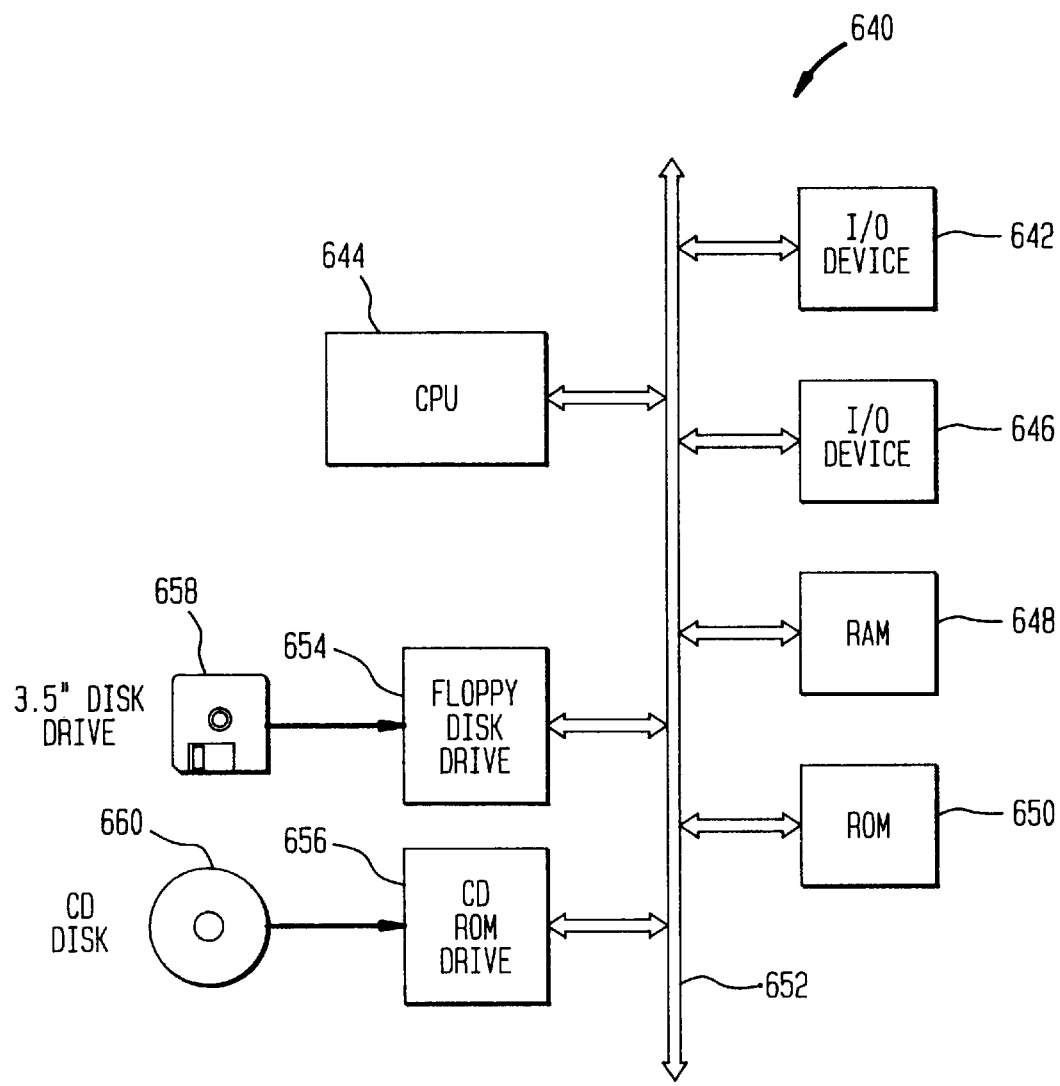
FIG. 6 illustrates, in block diagram form, a typical computer system for accomplishing the method of the present invention.

Referring now to FIG. 6, in a preferred embodiment, the method for determining the optimal amount of buckets needed to approximate a data distribution with a specified error of approximation of the present invention is performed on a programmed general-purpose computer system 640. The computer system 640 includes a central processing unit (CPU) 644 that communicates to an input/output (I/O) device 642 over a bus 652. A second I/O device 646 is illustrated, but is not necessary to practice the method of the present invention. The computer system 640 also includes random access memory (RAM) 648, read only memory (ROM) 650, and may include peripheral devices such as a floppy disk drive 654 and a compact disk (CD) ROM drive 656 which also communicate with CPU 644 over the bus 652. It must be noted that the exact architecture of the computer system 640 is not important and that any combination of computer compatible devices may be incorporated into the system 640 as long as the method of the present invention can operate on a system 640 having a CPU 644, RAM 648 and storage memory as described below. Moreover, the program for CPU 644 which causes it to implement the invention may be stored in ROM 650, CD-ROM 660, floppy disk 658, a hard drive or any other medium capable of storing a program. During execution of the program it will be loaded into RAM 648. All of these devices communicate with CPU 644 as is well known in the art.

The CPU 644 performs the logical and mathematical operations required by the method of the present invention, such as data manipulation, as well as other arithmetic and logical functions generally understood by those of ordinary skill in the art. The RAM 648 is used to store the data to be approximated and program instructions required to implement the inventive method and can be comprised of conventional random access memory (RAM), bulk storage memory, or a combination of both as generally understood by those of ordinary skill in the art. The I/O device 642 is responsible for interfacing with an operator of the computer system 640 or with peripheral data devices such as a hard drive or other device (not shown) to receive or distribute data as generally understood by those of ordinary skill in the art.

While the invention has been described in detail in connection with the preferred embodiments known at the time, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Accordingly, the invention is not to be seen as limited by the foregoing description, but is only limited by the scope of the appended claims.

What is claimed as new and desired to be protected by Letters Patent of the United States is:

1. A computer based method for determining a number of regions, said number being a factor of a minimum number of regions, a database data distribution can be partitioned into to create an approximation of said database which is within said factor of a maximum error measure, said method comprising the steps of:

storing said maximum error measure;

finding an upper limit number, said upper limit number being at most said factor of a maximum number of regions said database can be partitioned into to create an approximation within at most said factor of said stored maximum error measure;

determining whether said upper limit number is also said minimum number of regions said database can be partitioned into to create an approximation of said database which is within said factor of said stored maximum error measure; and using said factor of said minimum number of regions to approximate said database for searchable inquiries.

2. The method according to claim 1, wherein said determining step further comprises:

setting a first number value based on said upper limit number, said set first number value being less than said upper limit number;

calculating an error measure of approximation when said database is approximated by partitioning said database into b number of regions, said b being between said upper limit number and said set first number value; and determining whether said b is said minimum number of regions said database can be partitioned into to create an approximation of said database within said factor of said stored maximum error measure.

3. The method according to claim 2, wherein if said b is not said minimum number of regions said database can be partitioned into to create an approximation of said database within said factor of said stored maximum error measure, said method further comprises:

determining whether said calculated error measure exceeds said stored maximum error measure when said database is partitioned into said b number of regions;

replacing said upper limit number by said b number if said calculated error measure does exceed said stored maximum error measure;

replacing said set first number value with said b number if said calculated error measure does not exceed said stored maximum error measure; and repeating said calculating an error measure of approximation when said database is approximated by partitioning said database into b number of regions, said b being between said upper limit number and said set first number value step, said determining whether said calculated error measure exceeds said stored maximum error measure when said database is partitioned into said b number of regions step, said replacing said upper limit number step and said replacing said set first number value step until a minimum value for said b number of regions is found, said minimum value b being said factor of said minimum number of regions which said database can be partitioned into to create an approximation of said database within said factor of said stored maximum error measure.

4. The method according to claim 3, further comprising the step of:

storing said minimum value for said b.

5. The method according to claim 4, further comprising the step of:

outputting an indication of said factor of said minimum number of partitions said database can be partitioned into within said factor of said stored maximum error measure.

6. The method according to claim 5, wherein said factor is 3.

7. The method according to claim 1, wherein said maximum error measure is entered by a user.

8. The method according to claim 1, wherein said step of finding an upper limit number is performed by a binary search method.

9. The method according to claim 2, wherein said set first number value is equal to one half of said upper limit number.

10. The method according to claim 2, wherein said b is an average of said upper limit number and said set first number value.

11. The method according to claim 1, wherein said using step further comprises:

constructing an approximation of said database using a histogram technique with said factor of said minimum number of regions.

12. A computer readable storage medium containing a computer readable code for operating a computer to perform a method for determining a number of regions, said number being a factor of a minimum number of regions, a database data distribution can be partitioned into to create an approximation of said database which is within said factor of a maximum error measure, said method comprising the steps of:

storing said maximum error measure;

finding an upper limit number, said upper limit number being at most said factor of a maximum number of regions said database can be partitioned into to create an approximation within at most said factor of said stored maximum error measure;

determining whether said upper limit number is also said minimum number of regions said database can be partitioned into to create an approximation of said database which is within said factor of said stored maximum error measure; and using said factor of said minimum number of regions to approximate said database for searchable inquiries.

13. The computer readable storage medium according to claim 12, wherein said determining step further comprises:

setting a first number value based on said upper limit number, said set first number value being less than said upper limit number;

calculating an error measure of approximation when said database is approximated by partitioning said database into b number of regions, said b being between said upper limit number and said set first number value; and determining whether said b is said minimum number of regions said database can be partitioned into to create an approximation of said database within said factor of said stored maximum error measure.

14. The computer readable storage medium according to claim 13, wherein if said b is not said minimum number of regions said database can be partitioned into to create an approximation of said database within said factor of said stored maximum error measure, said method further comprises:

determining whether said calculated error measure exceeds said stored maximum error measure when said database is partitioned into said b number of regions;

replacing said upper limit number by said b number if said calculated error measure does exceed said stored maximum error measure;

replacing said set first number value with said b number if said calculated error measure does not exceed said stored maximum error measure; and repeating said calculating an error measure of approximation when said database is approximated by partitioning said database into b number of regions, said b being between said upper limit number and said set first number value step, said determining whether said calculated error measure exceeds said stored maximum error measure when said database is partitioned into said b number of regions step, said replacing said upper limit number step and said replacing said set first number value step until a minimum value for said b number of regions is found, said minimum value b being said factor of said minimum number of regions which said database can be partitioned into to create an approximation of said database within said factor of said stored maximum error measure.

15. The computer readable storage medium according to claim 14, further comprising the step of:

storing said minimum value for said b.

16. The computer readable storage medium according to claim 15, further comprising the step of:

outputting an indication of said factor of said minimum number of partitions said database can be partitioned into within said factor of said stored maximum error measure.

17. The computer readable storage medium according to claim 16, wherein said factor is 3.

18. The computer readable storage medium according to claim 12, wherein said maximum error measure is entered by a user.

19. The computer readable storage medium according to claim 12, wherein said step of finding an upper limit number is performed by a binary search method.

20. The computer readable storage medium according to claim 13, wherein said set first number value is equal to one half of said upper limit number.

21. The computer readable storage medium according to claim 13, wherein said b is an average of said upper limit number and said set first number value.

22. The computer readable storage medium according to claim 12, wherein said using step further comprises:

constructing an approximation of said database using a histogram technique with said factor of said minimum number of regions.

23. A system comprising a programmed computer and a stored database, wherein said computer is programmed to determine a number of regions, said number being a factor of a minimal number of regions, a data distribution of said stored database can be partitioned into for approximating said database which is within said factor of a maximum error measure by executing the steps of:

storing said maximum error measure;

finding an upper limit number, said upper limit number being at most said factor of a maximum number of regions said database can be partitioned into to create an approximation within at most said factor of said stored maximum error measure;

determining whether said upper limit number is also said minimum number of regions said database can be partitioned into to create an approximation of said database which is within said factor of said stored maximum error measure; and using said factor of said minimum number of regions to approximate said database for searchable inquiries.

24. The system comprising a programmed computer and a stored database according to claim 23, wherein said determining step further comprises:

setting a first number value based on said upper limit number, said set first number value being less than said upper limit number;

calculating an error measure of approximation when said database is approximated by partitioning said database into b number of regions, said b being between said upper limit number and said set first number value; and determining whether said b is said minimum number of regions said database can be partitioned into to create an approximation of said database within said factor of said stored maximum error measure.

25. The system comprising a programmed computer and a stored database according to claim 24, wherein if said b is not said minimum number of regions said database can be partitioned into to create an approximation of said database within said factor of said stored maximum error measure, said method further comprises:

determining whether said calculated error measure exceeds said stored maximum error measure when said database is partitioned into said b number of regions;

replacing said upper limit number by said b number if said calculated error measure does exceed said stored maximum error measure;

replacing said set first number value with said b number if said calculated error measure does not exceed said stored maximum error measure; and repeating said calculating an error measure of approximation when said database is approximated by partitioning said database into b number of regions, said b being between said upper limit number and said set first number value step, said determining whether said calculated error measure exceeds said stored maximum error measure when said database is partitioned into said b number of regions step, said replacing said upper limit number step and said replacing said set first number value step until a minimum value for said b number of regions is found, said minimum value b being said factor of said minimum number of regions which said database can be partitioned into to create an approximation of said database within said factor of said stored maximum error measure.

26. The system comprising a programmed computer and a stored database according to claim 25, further comprising the step of:

storing said minimum value for said b.

27. The system comprising a programmed computer and a stored database according to claim 26, further comprising the step of:

outputting an indication of said factor of said minimum number of partitions said database can be partitioned into within said factor of said stored maximum error measure.

28. The system comprising a programmed computer and a stored database according to claim 27, wherein said factor is 3.

29. The system comprising a programmed computer and a stored database according to claim 23, wherein said maximum error measure is entered by a user.

30. The system comprising a programmed computer and a stored database according to claim 23, wherein said step of finding an upper limit is performed by a binary search method.

31. The system comprising a programmed computer and a stored database according to claim 24, wherein said set first number value is equal to one half of said upper limit number.

32. The system comprising a programmed computer and a stored database according to claim 24, wherein said b is an average of said upper limit and said set first number value.

33. The system comprising a programmed computer and a stored database according to claim 23, wherein said using step further comprises:

constructing an approximation of said database using a histogram technique with said factor of said minimum number of regions.

* * * * *